United States Patent [19]
Puch

[11] Patent Number: 5,743,314
[45] Date of Patent: Apr. 28, 1998

[54] STUMP CUTTING TOOL ASSEMBLY

[75] Inventor: Leonard D. Puch, New Boston, Mich.

[73] Assignee: Green Manufacturing Inc., New Boston, Mich.

[21] Appl. No.: 789,002

[22] Filed: Jan. 27, 1997

Related U.S. Application Data

[63] Continuation-in-part of Ser. No. 635,484, Apr. 22, 1996, abandoned.

[51] Int. Cl.$^6$ .......................... A01G 23/06; B27G 13/04
[52] U.S. Cl. .................. 144/24.12; 144/241; 144/334; 144/34.1; 407/46; 407/113; 83/835; 83/839; 83/840
[58] Field of Search ................. 144/24.12, 34.1, 144/218, 240, 241, 334; 83/835, 836, 853, 840; 407/2, 46, 59, 113, 115

[56] References Cited

U.S. PATENT DOCUMENTS

| | | |
|---|---|---|
| Re. 28,651 | 12/1975 | Welborn . |
| 1,646,813 | 10/1927 | Davey et al. . |
| 3,570,566 | 3/1971 | McCreery . |
| 3,797,544 | 3/1974 | Ver Ploeg . |
| 3,935,887 | 2/1976 | Van Zante et al. . |
| 4,343,516 | 8/1982 | Aden .................. 407/46 |
| 4,506,715 | 3/1985 | Blackwell . |
| 4,738,291 | 4/1988 | Isley . |
| 4,744,278 | 5/1988 | Wright . |
| 4,759,394 | 7/1988 | Clemenson . |
| 4,812,087 | 3/1989 | Stashko .................. 407/113 |
| 4,827,995 | 5/1989 | Wilson . |
| 4,932,447 | 6/1990 | Morin . |
| 4,974,649 | 12/1990 | Manning . |
| 4,998,574 | 3/1991 | Beach et al. . |
| 5,005,622 | 4/1991 | Beach et al. . |
| 5,042,733 | 8/1991 | Hench . |
| 5,063,731 | 11/1991 | Hull et al. . |
| 5,131,305 | 7/1992 | MacLennan . |
| 5,135,035 | 8/1992 | Mills .................. 144/241 |
| 5,201,352 | 4/1993 | Hult . |
| 5,203,388 | 4/1993 | Bowling . |
| 5,211,212 | 5/1993 | Carlson et al. . |
| 5,261,306 | 11/1993 | Morey et al. .................. 144/241 |
| 5,269,355 | 12/1993 | Bowen . |
| 5,279,345 | 1/1994 | LeMaux et al. . |
| 5,289,859 | 3/1994 | Minton, Jr. et al. . |
| 5,363,891 | 11/1994 | Plante .................. 144/241 |
| 5,365,986 | 11/1994 | Hooser . |
| 5,497,815 | 3/1996 | Bowling . |

OTHER PUBLICATIONS

Vermeer Pro Series Stump Cutter Teeth Advertisement.
Super Tooth by Rayco Advertisement.
Border City Sales Company, 2 Pages of Catalog.
Leonardi Mfg. 1 Page Catalog.
Vermeer Model 665B Advertisement.
Rayco Super Tooth Advertisement.

*Primary Examiner*—W. Donald Bray
*Attorney, Agent, or Firm*—Bliss McGlynn, P.C.

[57] ABSTRACT

A stump cutting tool assembly for a stump cutting apparatus having a rotatable cutting wheel includes at least one tool holder removably secured to the cutting wheel, at least one cutting tooth mounted circumferentially and removably to the at least tool holder, the at least one tool holder including a wheel portion extending circumferentially along the cutting wheel and a tool portion extending axially at an angle to a plane of the wheel portion, the tool portion having an aperture extending circumferentially therethrough and the at least one cutting tooth including a shank and an insert attached to the shank.

21 Claims, 2 Drawing Sheets

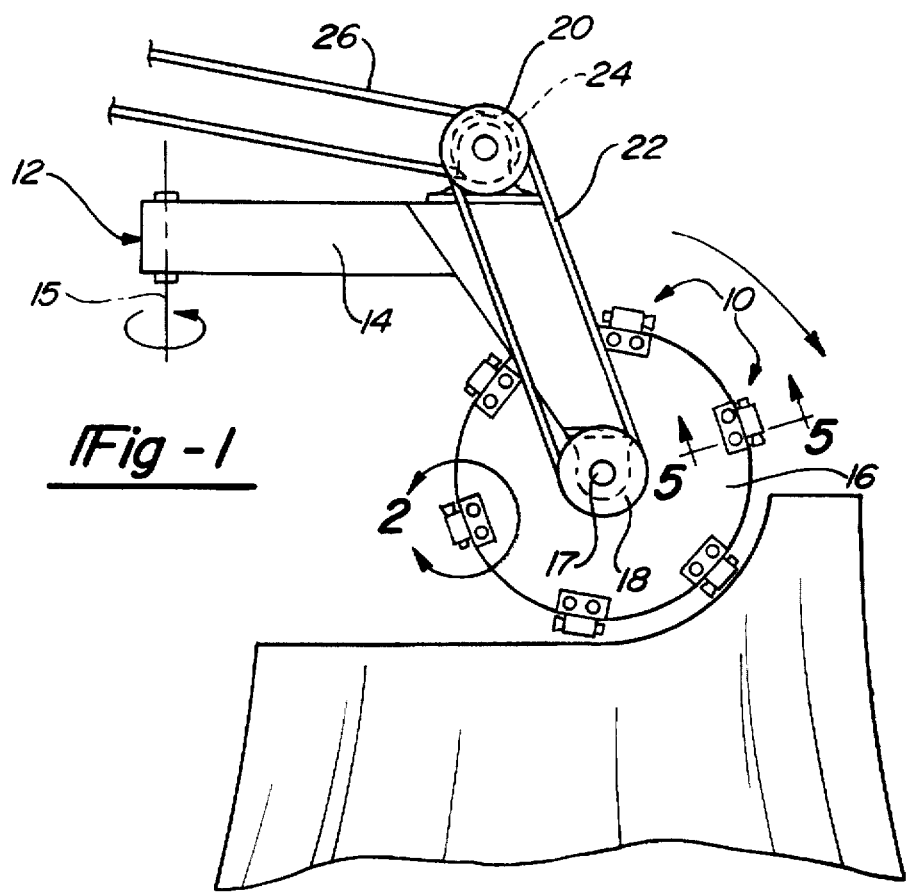
Fig-1
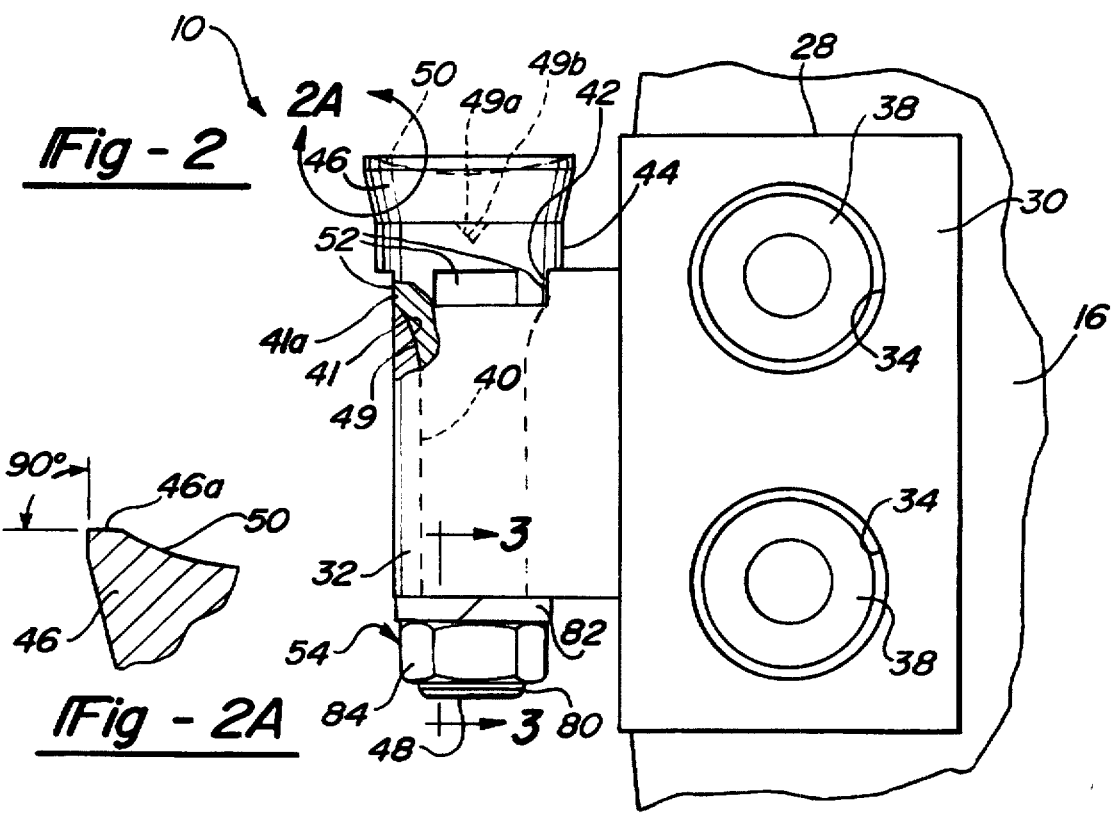
Fig-2
Fig-2A

5,743,314

STUMP CUTTING TOOL ASSEMBLY

CROSS-REFERENCE TO RELATED APPLICATION(S)

The present application is a continuation-in-part of patent application U.S. Ser. No. 08/635,484, filed Apr. 22, 1996 now abandoned.

BACKGROUND OF THE INVENTION

1. Field of the Invention

The present invention relates generally to a stump cutting apparatus and, more specifically, to a stump cutting tool assembly for a stump cutting apparatus.

2. Description of the Related Art

It is known to provide a stump cutting apparatus to grind or cut tree stumps. Typically, the stump cutting apparatus includes a rotatable cutting wheel having a plurality of cutting tools disposed circumferentially about the wheel. The cutting tool includes a one-piece tooth/pocket combination fastened to the wheel. Although this cutting tool has worked well, it suffers from the disadvantage that, if a cutting tooth is broken or needs replacing, the one-piece tooth/pocket must be unfastened and entirely removed from the wheel. This is costly in time and is undesired.

However, one attempt to overcome the above disadvantages is to provide a cutting tool having a two piece pocket and tooth combination. This cutting tool includes a circular tool pocket or holder fastened to the wheel and having a rectangular recess extending diametrically across the outer surface thereof. The cutting tool also includes a tooth having a rectangular shank disposed in the recess. However, this cutting tool suffers from the disadvantage that, when a portion of the cutting tooth wears, the entire cutting tooth and shank must be replaced which is undesired.

U.S. Pat. No. 5,131,305 to MacLennan discloses a saw tooth and holder. A circular saw is provided with a disc and tooth holders mounted on the periphery of the disc. Each tooth holder has a pair of legs straddling the disc and fasteners for fastening the holder to the disc. A cutting tooth is provided with a shank in form of a bolt which extends through a bore in the holder engaging a tooth head.

One disadvantage of the MacLennan tooth holder is that the tooth head is retained with a bolt which compromises the structural integrity of the tooth head because it is effectively hollow. Another disadvantage of this tooth holder is that the length of the cutting tooth in the holder is small, resulting in less bracing and less resistance to side load stress. Thus, there is a need in the art to provide a stump cutting tool assembly which is structurally sound and more resistant to side loads.

U.S. Pat. No. 5,135,035 to Mills discloses an independently rotatable cutting bit for rotary wheel cutters. An assembly includes a holding block which rotatably supports a cylindrical cutting bit. The cutting bit has a stepped diameter circularly symmetric support body and an annular disc-shaped tungsten carbide cutting tip.

One disadvantage of the Mills cutting tip is that the cutting tip has a straight angle of approximately forty-five degrees (45°) which is more likely to fatigue due to a stress point between the holder and the cutting tip created by side loads. Another disadvantage of the Mills cutting tip is that the cutting tip rotates freely around its longitudinal axis wearing all cutting edges constantly when in use and has less surface area of retention. Thus, there is a need in the art to provide a stump cutting tool assembly which has less stress points and prevents free rotation of the cutting tip.

SUMMARY OF THE INVENTION

It is, therefore, one object of the present invention to provide a stump cutting tool assembly for a stump cutting apparatus.

It is another object of the present invention to provide a stump cutting tool assembly that has a quick change retention of the cutting tooth to the tool pocket or holder.

It is yet another object of the present invention to provide a stump cutting tool assembly that has an indexable cutting tooth.

It is still another object of the present invention to provide a stump cutting tool assembly that has a cutting tooth with a recess for improved cutting action.

It is a further object of the present invention to provide a stump cutting tool assembly that has a tool holder with a circumferentially extending aperture to hold a cutting tooth.

It is yet a further object of the present invention to provide a stump cutting tool assembly which efficiently transfers side loads of the cutting tooth to the holder by reducing stress points therebetween.

It is still a further object of the present invention to provide a stump cutting tool assembly having greater structural integrity and more resistance to side load stress.

It is another object of the present invention to provide a stump cutting tool assembly having an increased surface area of retention for the cutting tooth.

It is yet a further object of the present invention to provide a stump cutting tool assembly having a cutting tooth that rotates and locks in a positive detent to expose a new sharp cutting edge when desired.

To achieve the foregoing objects, the present invention is a stump cutting tool assembly for a stump cutting apparatus having a rotatable cutting wheel including at least one tool holder removably secured to the cutting wheel and at least one cutting tooth mounted circumferentially and removably secured to the at least one tool holder. The tool holder includes a wheel portion extending circumferentially along the cutting wheel and a tool portion extending axially at an angle to a plane of the wheel portion. The tool portion has an aperture extending circumferentially therethrough and the cutting tooth includes a shank and an insert attached to the shank.

One advantage of the present invention is that a new and improved stump cutting tool assembly is provided for a stump cutting apparatus. Another advantage of the present invention is that the stump cutting tool assembly has quick change retention of the cutting tooth to the tool holder. Yet another advantage of the present invention is that the stump cutting tool assembly has an indexable cutting tooth for longer life of the cutting tool. Still another advantage of the present invention is that the stump cutting tool assembly has a cutting tooth with a spherical recess and a flat negative angle periphery for stronger edge support. A further advantage of the present invention is that the stump cutting tool assembly has a circumferentially extending aperture to hold the cutting tooth for easier assembly and disassembly. Yet a further advantage of the present invention is that the length of the aperture through the holder and length of the cutting tooth is at least twice the diameter of the shank. Still a further advantage of the present invention is that the aperture of the holder and shank of the cutting tooth have complimentary mating radii to efficiently transfer load of the cutting tooth to the holder, making it more resistant to fatigue and side load stress. Another advantage of the present invention is that the insert has a solid cross-section and is less likely to fail than an insert with hole for a bolt. Yet another advantage of the present invention is that the stump cutting tool assembly has a locknut or lock washer and nut to increase surface area of retention of the cutting tooth. Still another advantage of the present invention is that the stump cutting tool assembly has a cutting tooth that rotates and locks in a positive detent, exposing a new sharp cutting edge which is desired when maximum cutting efficiency is needed quickly.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 1 is an elevational view of a stump cutting tool assembly, according to the present invention, illustrated in operational relationship with a stump cutting apparatus.

FIG. 2 is an enlarged view of circle 2 in FIG. 1.

FIG. 2A is an enlarged view of circle 2A in FIG. 2.

DESCRIPTION OF THE PREFERRED EMBODIMENT(S)

Figure 3:
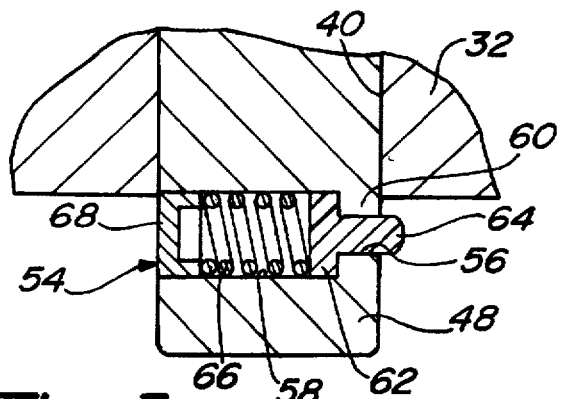
FIG. 3 is a fragmentary view of another embodiment of the stump cutting tool assembly of FIG. 1.

Referring to FIG. 1, a stump cutting tool assembly 10, according to the present invention, is illustrated in operational relationship with a stump cutting apparatus, generally indicated at 12. The stump cutting apparatus 12 includes a wheel frame 14 pivotally supported at one end for pivotal movement about an axis 15 to a remaining portion (not shown) of the stump cutting apparatus 12. The stump cutting apparatus 12 also includes a cutting wheel 16 rotatably mounted at the other end of the wheel frame 14 for rotational movement about an axis 17. The stump cutting apparatus 12 includes a first pulley 18 attached to the cutting wheel 16 and a second pulley 20 attached to the wheel frame 14. The stump cutting apparatus 12 also includes a belt 22 interconnecting the first pulley 18 and second pulley 20. The stump cutting apparatus 12 includes a third pulley 24 connected to the second pulley 20. The stump cutting apparatus 12 further includes a second belt 26 interconnecting the third pulley and a rotational source such as a motor (not shown). The rotational source rotates or moves the second belt 26 to rotate the third pulley 24, in turn, rotating the second pulley 20. Rotation of the second pulley 20 causes the first belt 22 to move, in turn, rotating the first pulley 18 and cutting wheel 16. It should be appreciated that the stump cutting apparatus 12 is conventional and known in the art.

Referring to FIGS. 1 through 3 and 5, at least one stump cutting tool assembly 10, according to the present invention, is mounted to the cutting wheel 16. Preferably, a plurality of stump cutting tool assemblies 10 are mounted circumferentially about the cutting wheel 16. Each stump cutting tool assembly 10 includes at least one pocket or tool holder 28. Preferably, a pair of tool holders 28 are disposed across from each other on opposite sides of the cutting wheel 16. The tool holder 28 has a generally rectangular wheel portion 30 extending circumferentially along the cutting wheel 16 and a generally rectangular tool portion 32 extending axially at an angle such as twenty degrees (20°) from one end of the wheel portion 30. The tool portion 32 has a longitudinal length less than a longitudinal length of the wheel portion 30. One of the tool holders 28 have at least one, preferably, a pair of counter bores 34 extending axially therethrough and the other tool holder 28 has at least one, preferably a pair of threaded apertures 36 extending axially therethrough. The stump cutting tool assembly 10 includes a fastener 38 such as a bolt extending through the counterbore 34 and aperture 37 in the cutting wheel 16 and threadably engaging the threaded aperture 36. It should be appreciated that any suitable means may be used to fasten the tool holders 28 to the cutting wheel 16.

The tool portion 32 of the tool holder 28 includes an aperture 40 extending longitudinally or circumferentially therethrough. The aperture 40 has a length at least two times or twice a diameter of a shank 48 of a cutting tooth 44 to be described. The aperture 40 has a convex radius 41 along a periphery or perimeter of an opening 41a of the aperture 40 to mate with a corresponding radius 49 on the shank 48. The mating radii 41 and 49 efficiently transfer loads between the cutting tooth 44 and tool portion 32 and reduce stress points therebetween, in turn, reducing fatigue of the shank 48 of the cutting tooth 44. The tool portion 32 also includes a shoulder 42 at one end of the aperture 40 for a function to be described. Preferably, the tool holder 28 is made of a metal material such as forged steel which is heat treated to a predetermined hardness such as 35–50 Rockwell. It should be appreciated that the radii 41 and 49 are stronger to transfer loads deeper into the tool portion 32 than a planar incline or angle or a ninety-degree angle.

The stump cutting tool assembly 10 also includes a cutting tooth 44. The cutting tooth 44 includes an insert 46 and a shank 48 extending longitudinally therefrom. The shank 48 has a length at least twice its diameter and a concave radius 49 to matingly engage the radius 41 of the aperture 40 in the tool portion 32. When the shank 48 extends through the aperture 40, it has a greater length of bracing in the tool portion 32 and is more resistant to side load stress. The shank 48 also has a recess 49a in one end for a function to be described. The shank 48 is a solid member made of a metal material such as forged steel which is heat treated to a predetermined hardness such as 35–50 Rockwell.

The insert 46 preferred is generally circular in shape and has a generally concave shaped recess 50 in an end thereof. The recess 50 terminates prior to the periphery of the insert 46 to provide a flat negative rake angle with a cutting edge 46 at a 90° right angle as illustrated in FIG. 2A, adding strength to the cutting edge 46a. The insert 46 also is tapered longitudinally such as five degrees (5°) to provide a relief. The insert 46 is a solid member made of a cutting material such as tungsten carbide. The insert 46 has a projection 49b extending axially. Preferably, the projection 49b is generally conical in shape and is disposed in the corresponding recess 49a of the shank 48. As a result, the insert 46 is self-centering to and in locating the insert 46 to the shank 48 during manufacturing, and has less possible fatigue points. The insert 46 is bonded to the shank 48 by suitable means such as brazing, fasteners or the like. It should be appreciated that the insert 46 may have any suitable geometric shape. It should also be appreciated that the recess 50 improves the cutting action of the insert 46. It should further be appreciated that the insert 46 is a effectively solid one piece design having greater structural integrity.

The shank 44 is generally cylindrical in shape and extends through the aperture 40 in the tool portion 32 of the tool holder 28. The cutting tooth 44 also includes at least one, preferably a plurality of shoulders 52 disposed circumferentially about the shank 48 at a predetermined amount such as one hundred twenty degrees (120°). The shoulders 52 are generally planar surfaces which matingly engage the planar surface of the shoulder 42 of the tool portion 32 to resist rotation of the shank 48 about its longitudinal axis. The insert 46 may be indexed by removing the shank 48 from the aperture 40 and rotating the insert 46 such that an adjacent shoulder 52 engages the shoulder 42 of the tool portion 32 for positive locking. It should be appreciated that indexing the insert 46 increases the life of the insert 46 by exposing a new sharp cutting edge which is desirable when maximum cutting efficiency is needed quickly as compared to the Mills patent, previously described.

The stump cutting tool assembly 10 also includes a quick change retention mechanism, generally indicated at 54, for retaining the cutting tooth 44 to the tool holder 28. In one embodiment of FIG. 2, the quick change retention mechanism 54 includes threads 80 on one end of the shank 48 which extends through the tool portion 32. The quick change retention mechanism 54 also includes a lock washer 82 disposed over the threads 80 of the shank 48 and abutting the tool portion 32 and a nut 84 having threads (not shown) threadably engaging the threads 80 of the shank 48. The lock washer 82 and nut 84 increase the surface area of retention of the cutting tooth 44 compared to the Mills patent, previously described. It should be appreciated that a locknut could be used in place of the lock washer 82 and nut 84. It should also be appreciated that, given the dirty abrasive environment, the lock washer 82 and nut 84 is highly desired.

In another embodiment of FIG. 3, the quick change retention mechanism 54 includes an aperture 56 extending through the shank 48 and a cavity 58 in the shank 48 communicating with the aperture 56. The quick change retention mechanism 54 includes a pin 60 having a base portion 62 disposed in the cavity 58 and a pin portion 64 extending through the aperture 56. The quick change retention mechanism 54 also includes a spring 66 such as a coil spring disposed in the cavity 58 adjacent the base portion 62 and a cap 68 disposed adjacent the spring 66 in the end of the cavity 58. The spring 66 urges the pin portion 64 through the aperture 56 to prevent the shank 48 from exiting the tool portion 32. It should be appreciated that the pin portion 64 is pressed inwardly to remove the shank 48 from the tool portion 32 through the aperture 40.

Figure 4:
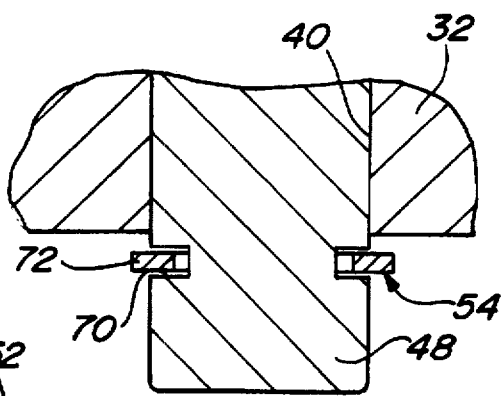
FIG. 4 is a view similar to FIG. 3 of yet another embodiment of the stump cutting tool assembly of FIG. 1.
Figure 5:
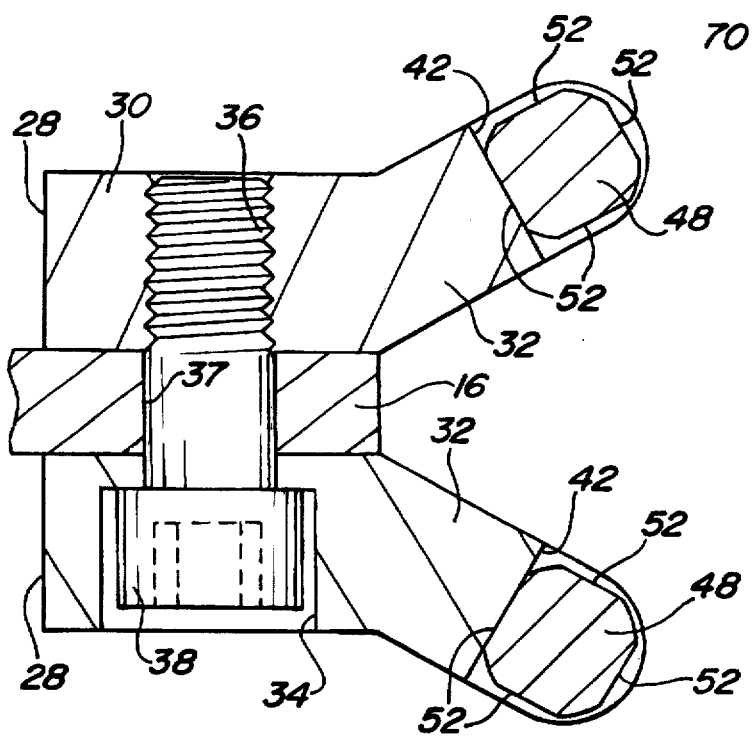
FIG. 5 is a sectional view taken along line 5—5 of FIG. 1.

In yet another embodiment of FIG. 4, the quick change retention mechanism 54 includes a groove 70 disposed circumferentially about the shank 48 and a retaining ring 72 disposed in the groove 70. It should be appreciated that the retaining ring 72 prevents the shank 48 from being removed from the aperture 40 of the tool portion 32 and is removed from the groove 70 to allow the shank 48 to be removed from the tool portion 32.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A stump cutting tool assembly for a stump cutting apparatus having a rotatable cutting wheel comprising:

at least one tool holder removably secured to the cutting wheel;

at least one cutting tooth having a substantially continuous unobstructed front face and a substantially continuous unobstructed rear face mounted circumferentially and removably to said at least one tool holder;

said at least one tool holder comprising a wheel portion extending circumferentially along the cutting wheel and a tool portion extending axially at an angle to a plane of said wheel portion, said tool portion having an aperture extending circumferentially therethrough; and means mounting said cutting tooth to said tool holder including a shank attached to said rear face of said cutting tooth, said shank comprising an elongated portion extending through said aperture and an insert attached to said shank.

2. A stump cutting tool assembly as set forth in claim 1 wherein said shank and said aperture each have a length at least twice a diameter of said shank.

3. A stump cutting tool assembly as set forth in claim 1 wherein said shank and said aperture each have complementary radii at one end for engagement therebetween.

4. A stump cutting tool assembly as set forth in claim 1 wherein said shank has a recess in one end and said insert has a projection disposed in said recess.

5. A stump cutting tool assembly as set forth in claim 1 wherein said shank is solid and unitary.

6. A stump cutting tool assembly as set forth in claim 4 wherein said insert is solid and unitary and generally circular in shape.

7. A stump cutting tool assembly as set forth in claim 4 wherein said insert has a recess on one surface thereof and terminating prior to a periphery of said insert to provide flats on a cutting edge thereof.

8. A stump cutting tool assembly as set forth in claim 1 wherein said insert is brazed to said shank.

9. A stump cutting tool assembly as set forth in claim 1 wherein said shank has a plurality of shoulders disposed circumferentially thereabout, each of said shoulders cooperating with said shoulder of said tool holder for indexing said cutting tooth.

10. A stump cutting tool assembly as set forth in claim 1 wherein said shank extends completely through said aperture.

11. A stump cutting tool assembly as set forth in claim 10 including quick change retention means for retaining said shank to said tool portion.

12. A stump cutting tool assembly as set forth in claim 11 wherein said quick change retention means comprises threads on one end of said shank and a lock washer disposed over said threads and abutting said tool portion and a nut threadably engaging said threads.

13. A stump cutting tool assembly as set forth in claim 11 wherein said quick change retention means comprises a groove in said shank and a retaining ring disposed in said groove.

14. A stump cutting tool assembly as set forth in claim 11 wherein said quick change retention means comprises a recess in said shank and a spring loaded pin disposed in said recess.

15. A stump cutting tool assembly for a stump cutting apparatus having a rotatable cutting wheel comprising:

at least one tool holder removably secured to the cutting wheel and having an aperture extending circumferentially therethrough;

at least one cutting tooth having a substantially continuous unobstructed front face and a substantially continuous unobstructed rear face, an insert and means mounting said cutting tooth to said tool holder including a shank attached to said rear face of said cutting tooth, said shank comprising an elongated portion extending through said aperture, said insert having a recess on one surface thereof and terminating prior to a periphery of said insert to provide flats on a cutting edge thereof.

16. A stump cutting tool assembly for a stump cutting apparatus having a rotatable cutting wheel comprising:

at least one tool holder removably secured to the cutting wheel;

at least one cutting tooth having a substantially continuous unobstructed front face and a substantially continuous unobstructed rear face mounted circumferentially and removably to said at least one tool holder;

said at least one tool holder comprising a wheel portion extending circumferentially along the cutting wheel and a tool portion extending axially at an angle to a plane of said wheel portion, said tool portion having an aperture extending circumferentially therethrough; and means mounting said cutting tooth to said tool holder including a shank attached to said rear face of said cutting tooth, said shank comprising an elongated portion extending through said aperture and an insert attached to said shank.

17. A stump cutting tool assembly for a stump cutting apparatus having a rotatable cutting wheel comprising:

at least one tool holder removably secured to the cutting wheel;

at least one cutting tooth having a substantially continuous unobstructed front face and a substantially continuous unobstructed rear face mounted circumferentially and removably to said at least one tool holder;

said at least one tool holder comprises a wheel portion extending circumferentially along the cutting wheel and a tool portion extending axially at an angle to a plane of said wheel portion;

said tool portion having an aperture extending therethrough and a first shoulder at one end of said aperture;

means mounting said cutting tooth to said tool holder including a shank attached to said rear face of said cutting tooth, said shank comprising an elongated portion extending through said aperture and an insert attached to said shank; and said shank having a plurality of second shoulders disposed circumferentially thereabout, each of said second shoulders cooperating with said first shoulder to said tool portion for indexing said cutting tooth.

18. A stump cutting tool assembly for a stump cutting apparatus having a rotatable cutting wheel comprising:

at least one tool holder removably secured to the cutting wheel;

at least one cutting tooth having a substantially continuous unobstructed front face and a substantially continuous unobstructed rear face mounted circumferentially and removably to said at least one tool holder;

said at least one tool holder comprises a wheel portion extending circumferentially along the cutting wheel and a tool portion extending axially at an angle to a plane of said wheel portion;

said tool portion having an aperture extending therethrough and means mounting said cutting tooth to said tool holder including a shank attached to said rear face of said cutting tooth said shank comprising an elongated portion extending through said aperture and an insert attached to said shank; and a quick change retention means for retaining said shank to said tool portion.

19. A stump cutting tool assembly as set forth in claim 18 wherein said quick change retention means comprises a groove in said shank and a retaining ring disposed in said groove.

20. A stump cutting tool assembly as set forth in claim 18 wherein said quick change retention means comprises a recess in said shank and a spring loaded pin disposed in said recess.

21. A stump cutting tool assembly as set forth in claim 18 wherein said quick change retention means comprises threads on one end of said shank and a lock washer disposed over said threads and abutting said tool portion and a nut threadably engaging said threads.

* * * * *